March 30, 1948. F. L. STEGHART ET AL 2,438,583
EQUIPMENT FOR CARRYING OUT POLAROGRAPHIC ANALYSIS
Filed Feb. 27, 1943 3 Sheets—Sheet 1
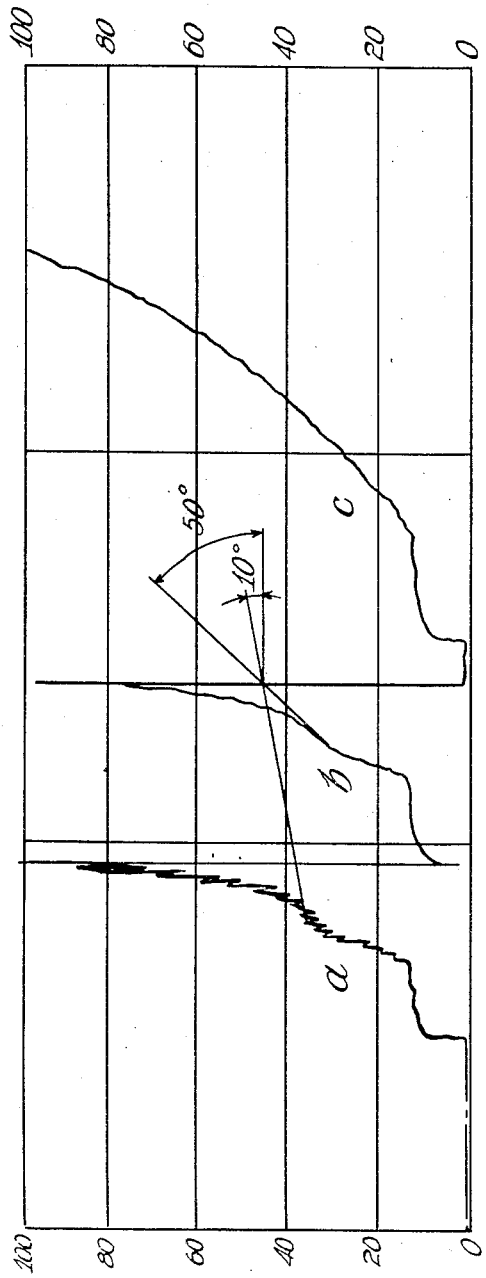
INVENTORS.
FRITZ LUDWIG STEGHART
BY DOUGLAS CRISP GALL
their ATT'Y.

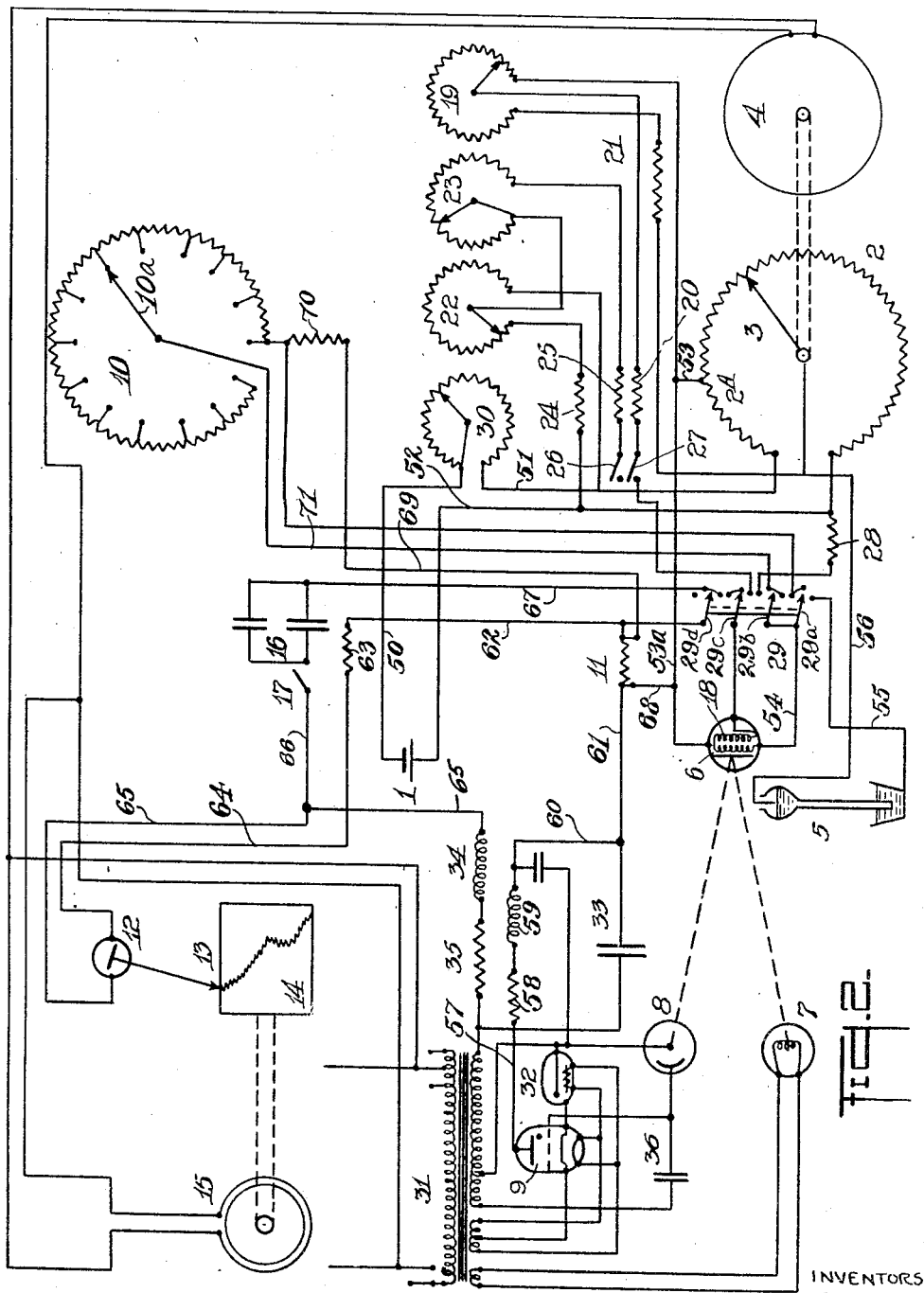

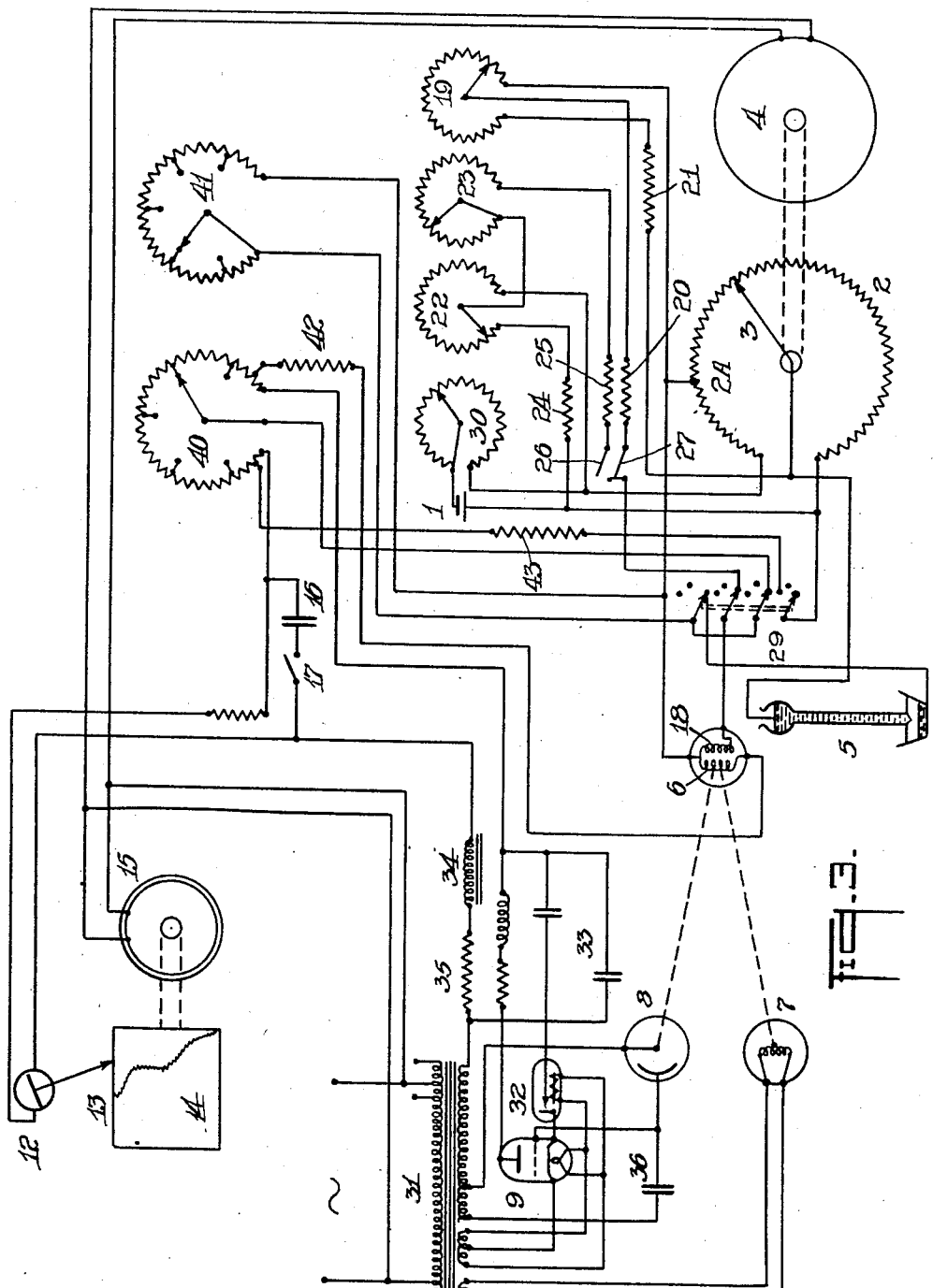

Patented Mar. 30, 1948

2,438,583

UNITED STATES PATENT OFFICE 2,438,583

EQUIPMENT FOR CARRYING OUT POLAROGRAPHIC ANALYSIS

Fritz Ludwig Steghart and Douglas Crisp Gall, South Norwood, London S. E. 25, England, assignor to Tinsley (Industrial Instruments) Limited, London, England Application February 27, 1943, Serial No. 477,486
In Great Britain March 5, 1942

8 Claims. (Cl. 346—32)

This invention relates to improvements in equipment for carrying out polarographic analysis.

The polarographic method of analysis consists essentially in applying a continually increasing electric potential to a cell which has a pool of mercury as its anode and mercury dropping from a capillary as its cathode. The pool of mercury is covered with a solution containing an excess of an electrolyte i. e. the ground solution. The current flowing through the cell is recorded and the form of the record gives a quantitive and qualitative polarographic analysis. The current to be measured is very small and is usually recorded photographically. This has however many disadvantages amongst which may be mentioned that a dark room is required for the development of the light sensitive papers, that the results are not available immediately and, that it is necessary either to observe the instrument continuously or to make several runs to make sure that no disturbances have occurred on the dropping mercury electrode. The time needed for the taking of one such polarogram is usually about 10–20 minutes. Furthermore, the selectivity is bad since the employment of a series resistance in the instrument cannot be avoided.

An object of the present invention is to provide polarographic equipment giving a high speed ink record of the actual current at any moment and alternatively of the mean current during the growth of each drop.

According to this invention the polarograph equipment comprises a dropping mercury electrode, a source of supply of current for the polarographic circuit, an electronic amplifier having at least one valve, and a movement of comparatively small time constant operating a pen to draw an ink record on paper.

According to a further feature of the invention the amplifier is a current amplifier having a small input-impedance.

Still further according to the invention the output of the valve of the amplifier is controlled by a photoelectric cell receiving light modulated by a light modulating galvanometer.

According to yet another feature of the invention the valve of the amplifier is a gas filled triode valve.

The Ilkovic equations of the diffusion current assume a mean current during the growth of each drop. Usually a line is drawn half way through the recorded oscillations in the polarograms. This is not necessarily correct because the galvanometers used are so slow that they cannot follow the growth of the current with the growth of the drops and will, therefore, indicate at their maximum deflection a current which may be only close to the mean. Since, however, the mean method and that of using maximum galvanometer deflection show agreement with the Ilkovic equation either one is practicable from a theoretical point of view.

Now, polarographic equipment has to deal with many different kinds of analysis, thus if the concentration is high, the steps in the polarograph are well defined and then there are no difficulties in measuring the height of these steps. It is different, however, when low concentrations have to be measured, when the steps in the polarographic diagram become less and less pronounced until hardly a slight break can be seen in the more or less steep rising line. For this type of polarographic analysis, the measurement of the current during the growth of each drop, which is possible with the present invention, is of very great importance.

In order that the invention may be clearly understood and readily carried into effect, it is hereinafter more fully described with the aid of the accompanying drawings which are given by way of example only and not of limitation.

In these drawings:

Figure 1 shows for comparison purposes three different polarograph records,

Figure 2 is a circuit diagram of one form of equipment according to the invention, and Figure 3 is a circuit diagram of an alternative form of equipment.

Certain integers in Figure 3 are identical with corresponding integers in Figure 2 and therefore these parts have been given similar reference numerals and further description of them omitted as unnecessary.

Turning now to Figure 1 of the drawings, there are shown three different polarograph records of a high purity zinc solution including small quantities of the impurities lead and cadmium. The first graph $a$ was taken by the equipment described with reference to Figure 2 whilst the second graph $b$ was taken with the minimum of damping that is possible on a free galvanometer without forced movement in the manner hitherto practiced. In both cases two steps occur, the first step at approximately 12 units in both curves, and the second step at 36 units in the first curve a, and at approximately 34 units in the second curve b. The difference in height is due to the fact that in curve a, the step is measured on the top of the oscillations, whereas in the case of b the mean value is taken. It is obviously very difficult to say, in curve b if the second step occurs at 32, 34 or 36 units. The big improvement achieved by the present invention, is shown by the fact made clear by this comparison that, whereas in curve a the step is only 10 degrees deflected from horizontal and its height can easily be measured, in the case of the curve b the deflection lies at 50° to the horizontal and is difficult to measure with any accuracy. Even if the step is of very short length, the amplifier high speed recorder of this invention is in position to follow the process immediately, whereas a highly damped record previously obtainable as shown in curve b was not.

Previous equipment using free moving galvanometers and photographic records have always been heavily damped, otherwise they would not have the necessary sensitivity and the known equipment using a voltage amplifier and automatic potentiometer, is damped to an even higher degree.

Curve c of Figure 1 shows further, the effect of the introduction of a resistance into the circuit of existing equipment which is unavoidable when ordinary photographic recorder methods and galvanometers are used. It will be seen that the second step has disappeared altogether.

Not only are the steps in the polarograph more pronounced and more easily readable with greater accuracy as is shown by curve a but the equipment according to the invention may enable chemical analyses to be carried out, for example in cases where the elements come near to one another, which are not possible with already existing equipment.

Referring now to Figure 2, a connection 50 leads from battery 1 to resistance 30 and thence through lead 51 to the wire resistance of the potentiometer 2 and back to battery 1 through lead 52. The resistance 30 is used to adjust the current in this circuit to a standard value. The motor 4 operates the contact 3 and turns it slowly in a clockwise direction. In series with the cell 5 is a high-resistance reflecting light galvanometer 6 which modulates the light from a suitable source 7 falling on a photoelectric cell 8 which in turn controls the grid of a gas filled triode valve 9, which is operated by alternating-mains current from a transformer 31.

The potentiometer 2 has a resistance of a few hundred ohms only. The potentiometer is tapped at 2A and a wire 53 extends from the point 2A to the common connection of the galvanometer 6. The galvanometer 6 is connected through wire 54 through lower contact 29a of switch 29 and wire 55 to the bottom of the cell 5. The top of the cell 5 is connected through wire 56 to the sliding contact 3.

The galvanometer 6 has a comparatively low resistance but the cell 5 has usually a very high resistance. Accordingly, the voltage across the cell 5 is varied by the contact 3 of the potentiometer 2.

The anode of valve 9 is connected through wire 57, resistance 58, inductance 59 and wires 60, 61 to a small standard resistance 11 and thence through wire 62, resistance 63 and wire 64 to one terminal of a recorder movement 12 which operates a pen 13 on a chart 14 moved by a motor 15. The other terminal of the movement 12 is connected through wire 65, inductance 34 and resistance 35 through transformer 31 to the cathode of valve 9.

An automatic switch 32 safeguards the gas filled valve 9 so that the anode current of the valve is not switched on before the cathode is hot. A condenser 33 and the choke 34 are provided to smooth out the interrupted rectified current passed by the valve 9. The resistance 35 limits the current in the anode circuit and another condenser 36 is provided to give the grid voltage a correct phase in relation to the photoelectric cell 8. The output of current from the valve is thereby controlled by preventing the start of the flow of anode current over a part of the positive half wave, so that the flow of anode current starts at such a point that the mean anode current which is fed back to the input, compensates the input current.

The galvanometer 6 is also connected through a high resistance 10 to the small standard resistance 11, that is included in the anode circuit of the valve 9. Two large condensers 16 can be connected across the terminals of recorder movement 12 by means of a switch 17 which is connected to wire 65 through wire 66, the other side of condensers 16 being connected to wire 62 through a wire 67 and the upper contact 29d of switch 29. As already mentioned, the current to be measured depends on the voltage between the point 2A of the potentiometer 2 and the contact 3. The potentiometer is tapped at 2A because positive and negative voltages are required in the polarograph. The positive voltages are available on the left of the tapping point 2A and the negative voltages are available on the right thereof.

The current passes from point 2A, through wires 53, and 53a to the galvanometer coil 6, through wire 54, lower contact 29a of switch 29 and wire 55 to the cell 5 and thence through wire 56 to the contact 3. This current is to be measured and amplified.

In parallel with the galvanometer coil 6 is another circuit through wire 53a, wire 68, standard resistance 11, wire 69, resistance 70, potentiometer 10, moving contact 10a, of said potentiometer, wire 71 and contact 29b of switch 29.

As already mentioned the anode current from valve 9 passes through the standard resistance 11 and produces an electromotive force in the last mentioned circuit, which maintains the galvanometer 6 in balance. The larger the resistance of potentiometer 10, the larger the current produced by valve 9 has to be to maintain the galvanometer 6 balanced. The term "balanced" includes a slight unbalancing which is just sufficient to throw a small amount of light onto the photocell 8, big enough to produce the necessary output from the valve 9. It is possible by varying the resistance 10 to alter the amplification factor of the amplifier.

In this instance it is important that the effective resistance in the circuit should be kept as small as possible, otherwise the wave front of the records are not steep but are flat and distorted. However, in spite of the use of a high resistance galvanometer 6, the effective resistance of the circuit above described, is very small. This is so because when current is passed through the input circuit of the amplifier including the galvanometer, the latter starts deflecting and modulates the light falling on the photocell 8 which in its turn controls the valve 9. The anode current of this valve however passes in an opposite direction through the resistance 11 and produces a voltage drop across the galvanometer 6. This voltage drop will compensate the voltage drop across the galvanometer produced by the cell current and reduces thereby the effective input resistance of the amplifier to a negligible value. The galvanometer 6 is therefore carrying out a forced movement of much higher speed than its free movement and the time needed for its balancing is very small.

The movement 12 is so designed that its time constant is low enough to give a record of the current at any moment when the condensers 16 are switched off and a mean current showing only small oscillations when these condensers are switched in. Another way of changing the damping of the movement 12 is by changing its inertia as by positioning weights on and off the movement.

During polarographic analysis another effect, the so-called condenser current, is often disturbing. It can be eliminated by sending through the galvanometer a countercurrent which increases very slowly and uniformly proportional to the voltage across the cell 5. The voltage between the sliding contact 3 of the potentiometer 2 and fixed point 2A on the potentiometer is used to obtain this countercurrent, but it is difficult to introduce it into the cell circuit without affecting at the same time the cell potential. This disadvantage is eliminated by providing a second winding 18 in the galvanometer 6 and by sending the countercurrent through this winding to eliminate the effect of the condenser current. In substance this is the same as a slowly changing zero suppression, and it is, therefore, possible to use the same coil 18 for the suppression of zero. To avoid an unnecessary number of connections on a very sensitive galvanometer, the normal and additional coils have one common terminal so that only three terminals are necessary. The additional winding 18, which is small compared with the main windings, is, according to the polarograph taken, carrying either no current or the countercurrent, or the countercurrent and a current for obtaining constant electrical suppression or only the latter. The size of the condenser current can be adjusted by means of a rheostat 19 whilst the resistances 20 and 21 are provided to reduce the condenser current to its proper range.

Especially when the polarograph is used for laboratory purposes it is often desirable to carry out a quantitative analysis of a small amount of a comparatively negative element (Ni, Zn) in the presence of a large amount of a more positive element and to do this it is necessary to suppress a large step to measure the small step that is built up on its top. Then a record can be taken with a big amplification of the small wave. It is desirable that for obtaining this record, the potential in the cell circuit must not be changed. To obtain this effect a small current is sent through the galvanometer 6 in the opposite direction to the current from the dropping mercury electrode of the cell 5. To avoid any interference with the anode current that has to be recorded, this current also is sent through the coil 18 of the galvanometer 6. The size of the suppression can be adjusted by means of the rheostat 22 and 23 while the fixed resistances 24 and 25 reduce the current to its proper value. A switch 26 is provided to cut out this device when it is not required and a further switch 27 allows the cutting out of the condenser current device.

Means have to be provided to standardise the current from the battery 1 after measuring its voltage, and this is done in the present instance, by measuring the potentiometer current through a resistance 28. A two-throw switch 29 is provided which if pressed upwards permits this current to be measured, and which if pressed downwards is in position for the carrying out of the test. When the switch 29 is pressed upwards, a certain deflection is obtained on the movement 12 and if this deflection is either too large or too small the rheostat 30 is operated.

The resistances 22 and 23 serve as a zero suppression. Very often it is desirable to measure a current that obtains a maximum value of 40 microamps. not over the whole range but to obtain a record only over the range of 30–40 microamps. For such a purpose a zero suppression is required. This can be done simply by shifting the zero of the recorder 12 to the appropriate value and operating the potentiometer 10 in such a way that the necessary output current to cover the full range of the paper chart 14 is obtained by 10 microamps., and not as would be done in the ordinary way, 50 microamps. The latter would allow, of course, a reading of a current amounting to 40 microamps. There are, however, limits to the zero suppression that can be obtained by setting the zero of the movement 12 and therefore an additional zero suppression is incorporated by means of the adjustable resistances 22 and 23. The potentiometer 22 lies across the battery 1 and resistance 30, the potentiometer 23 taps off one point and conducts a current through to resistance 25, through the then closed switch 26, through the middle contact 29c of the switch 29 and through the galvanometer coil 18 and back together with the potentiometer current passing potentiometer 2 to the battery circuit. According to the position of the rheostat 22 this current might be positive or negative whatever the direction of the current to be measured passing through coil 6 is like. It can, therefore, be used to increase or to suppress part of the effect that is exerted on the double coil 6, 18 by the current that passes through the cell 5 and it can, therefore, be used either as a zero suppression or to increase the value that is to be measured by arbitrary amounts. This latter is done in case the potentiometer is used on the left side of the contact 2A. Under ordinary conditions this would mean of course, that a reverse current would pass the galvanometer and would make it move in the wrong direction. By means of so called zero suppression which operates positive and negative as just described, such an effect can be turned into the contrary effect by increasing it by the necessary amount.

In Figure 1 two steps are shown, a first one that is approximately 10 units high and a second step that is approximately 35 units high. It sometimes happens, however, that one has to deal not with two such steps, which are more or less of the same size. Sometimes the first step is 80 units large and the second step is only 6 units large. In such a case if only the second small step from 80–85 units is to be measured on top of a step that ranges from 0–80 units, the zero suppression that has just been described is used and a record is taken of the small step range from 80–85 units on top of the large step.

The main potentiometer 3 is electrically linked with the paper drive 15 and the paper is calibrated in volts. Instead of this electrical link, a mechanical link can be provided to ensure synchronous movement.

The way in which the galvanometer is used in the described amplifier makes the instrument quite insensitive against vibrations on the big ranges and very much less sensitive on the smaller ranges.

In known equipment, the employment of a resistance has considerable disadvantages. There are, however, a few rather exceptional cases, where it is desirable to introduce a resistance and to obtain distorted wave forms. This can be done with the equipment described above, simply by putting in a variable resistance in series, but if one and the same work has to be carried out always as a matter of routine then it is possible to use modified equipment which will now be described with reference to Figure 3. In this case the small standard resistance 11 in the anode circuit of the valve 9 of Figure 2 is left out, and a resistance 41 is put in series with the dropping mercury electrode 5. The amplifier thus amplifies the voltage drop across this resistance 41 which is counterbalanced by the voltage drop of the anode current when it passes through the standard resistance 40. If the two voltage drops are not equal and opposite, a current passes through the main coil of the galvanometer 6 and causes it to deflect and either increase or decrease the light on the photocell 8 until a balance is obtained. In this case also the galvanometer 6 is carrying out a forced movement, with a much higher speed than its free movement, and the time needed for its balancing is comparatively small. By changing the tapping on the resistance 40 it is possible to change the amplification of the amplifier. Resistance 41 changes the resistance in the circuit of the dropping mercury electrode and makes it, therefore, possible to adjust the influence on the polarograph to different degrees. Further resistances 42 and 43 are provided for adjusting of the circuit. All other parts of the amplifier work as described with reference to Figure 2, and the output current from the valve is controlled by preventing the start of the flow of anode current, over part of the positive half wave, so that the flow of anode current starts at such a point that the mean anode current, which is fed back to the input compensates the input voltage.

The amplifier equipment described with reference to Figure 3 has, therefore, a very high input resistance which enables one to measure the voltage across the resistance 40, even if this voltage is very small and the current flowing through it is very small also. On the other hand the input resistance of the amplifier equipment described with reference to Figure 2, is very small. The amplifier equipment described with reference to Figure 2 can, therefore, be compared to a high quality ammeter, whereas amplifier equipment described with reference to Figure 3 can be compared with a high quality voltmeter.

All the adjustments regarding counter current and suppressed zero in the amplifier as described in Figure 3 is exactly the same as in Figure 2.

We claim:

1. In equipment for carrying out polarographic analysis an electrolytic cell having a polarised electrode, means for applying an electromotive force to said cell, a light modulating galvanometer, means for passing at least part of the current traversing said cell through said galvanometer to produce a torque in the galvanometer representative of said cell current, a source of light, at least one photoelectric cell receiving the light modulated by said galvanometer, means for causing said photo-electric cell to control the output current of at least one valve which passes a second current, means for passing said second current in opposite direction through said galvanometer to cause the resultant countertorque to effect a balance of said galvanometer, and a recording device operated by the output current of the said valve.

2. In equipment for carrying out polarographic analysis, an electrolytic cell having a polarised electrode, means for applying an electromotive force to the cell, means for continuously uniformly varying the electromotive force fed to said cell, means for moving said electromotive force varying means, a light modulating galvanometer, means for passing at least part of the current traversing said cell through said galvanometer to produce a torque in said galvanometer representative of said current, a source of light, at least one photo-electric cell receiving the light modulated by said galvanometer, at least one valve, means for connecting said photo-cell to the grid of said valve to control the output current, means for passing at least part of said output current counterwise to said galvanometer to effect with the inherent torque of the galvanometer a balance of said galvanometer, a pen carrying movement which is operated by said output current, a paper chart, means for moving the said paper chart past said pen, and means for synchronising the movement of said paper moving means with the movement of said current varying means.

3. In equipment for carrying out polarographic analysis, an electrolytic cell having a polarised electrode, means for applying an electromotive force to said cell, means for continuously uniformly varying the electromotive force applied to the said cell, means for moving the said current varying means, a light modulating moving coil galvanometer in circuit with said cell through which is passed a representative current which produces a torque in said moving coil representative of the current passing through the cell, a source of light, at least one photo-electric cell receiving the light modulated by the galvanometer, at least one valve, impedance means for varying the amplification factor of said valve, means for connecting the said photo-cell to the grid of the said valve to control the output current, means for passing at least part of said output current as a counter current through said galvanometer to effect together with the inherent torque of the galvanometer spring a balance of said moving coil, a movement having a pen which is operated by the output current, means for increasing and decreasing the damping of the said movement, a paper chart, means for moving the said paper chart past said pen, and means for synchronising the movement of said paper chart moving means with the movement of said current varying means.

4. In equipment for carrying out polarographic analysis, a polarographic cell, means for applying an electromotive force to said cell, means for continuously uniformly varying the electromotive force fed to said cell, means for moving the said current varying means, a light modulating moving coil galvanometer in circuit with said cell, means for passing the current traversing the cell to said galvanometer to produce a torque in said moving coil representative of the current passing through said cell, a source of light, at least one photo-electric cell receiving the light modulated by the said galvanometer, an amplifier having a low input impedance and at least one valve, means connecting the grid of said valve to said photo-electric cell, means connecting the cathode of said valve to said galvanometer coil to pass current therethrough in opposition to the current which has traversed said cell to cause a countertorque which effects together with the inherent torque of the galvanometer spring a balance of said moving coil and of the amount of light falling onto the photo-cell, a movement having a pen which is operated by the output current, condensers and shunt switching means for bringing said condensers into circuit, a paper chart, means for moving the said paper chart past the said pen, and means for synchronising the movement of said paper chart moving means with the movement of said current varying means.

5. In equipment for carrying out polarographic analysis, an electrolytic cell having a polarised electrode, means for applying an electromotive force to the cell, means for varying the electromotive force fed to said cell, means for continuously moving said electromotive force varying means, a light modulating moving coil galvanometer, means for passing at least part of the cell current through the moving coil of said galvanometer to produce a torque therein representative of said cell current, a source of light, at least one photo-electric cell receiving the light from said source as modulated by said galvanometer, at least one thermionic valve, means for connecting said photo-cell to the grid of said valve to control the output current, a second moving coil in said galvanometer, means for sending part of said output current through said second coil to produce a torque therein, a movement having a pen which is operated by said output current, condensers in shunt with said movement, switch means for placing said condensers into and out of circuit, a paper chart, means for moving the said paper chart past said pen, and means for synchronising the movement of said paper moving means with the movement of said means for moving said current varying means.

6. In equipment for carrying out polarographic analysis an electrolytic cell having a polarised electrode, means for applying an electromotive force to said cell, means for continuously uniformly varying the electromotive force applied to the said cell, means for moving the said current varying means, a light modulating moving coil galvanometer in circuit with said cell through which is passed a representative current which produces a torque in said moving coil representative of the current passing through the cell, means for feeding current through said cell in opposition to the current from its cathode, means for feeding said current also through said galvanometer whereby an additional torque is produced in its moving coil, a source of light, at least one photo-electric cell receiving the light modulated by the galvanometer, at least one gas filled triode valve, impedance means for varying the amplification factor of said valve, means for connecting the said photo-cell to the grid of the valve to control the output current, means for connecting the cathode of said valve to said moving coil to pass at least part of said output current as a countercurrent through said galvanometer to effect together with the inherent torque of the galvanometer spring a balance of said moving coil, a movement having a pen which is operated by the output current, condensers in shunt with said movement, switch means for placing said condensers into and out of circuit, a paper chart, means for moving the said paper chart past said pen, and means for synchronising the movement of said paper chart moving means with the movement of said current varying means.

7. In equipment for carrying out polarographic analysis, a polarographic cell, means for applying an electromotive force to said cell, means for continuously uniformly varying the electromotive force fed to said cell, a light modulating moving coil galvanometer in circuit with said cell, means for passing at least part of the current traversing the cell through said moving coil to produce a torque therein representative of the current passing through said cell, a second winding in said galvanometer, means for suppressing large increases in the current through the galvanometer coil and for setting the zero of the galvanometer by feeding current in appropriate direction through said moving coil producing thereby an additional torque, a source of light, at least one photo-electric cell, receiving the light modulated by the said galvanometer, an amplifier having a low input impedance and at least one triode valve, means connecting the grid of said valve to said photo-electric cell, means connecting the cathode of said valve to said galvanometer coil to pass current therethrough in opposition to the current which has at least partly traversed said cell and said current for zero setting to cause a countertorque which effects together with the inherent torque of the galvanometer spring a balance of said moving coil and of the amount of light falling onto the photo-cell, a movement having a pen which is operated by the output current, condensers and shunt switching means for bringing said condenser into circuit, a paper chart, means for moving the said paper chart past the said pen, and means for synchronising the movement of said paper chart moving means with the movement of said electromotive force varying means.

8. In equipment for carrying out polarographic analysis, an electrolytic cell having a polarised electrode, means for applying an electromotive force to said cell, a resistance in series with said cell, a light modulating galvanometer, means for passing the current traversing said cell and said resistance through said galvanometer to produce a torque in the galvanometer representative of said current, a source of light, at least one photo-electric cell receiving the light modulated by said galvanometer, means for causing said photo-electric cell to control the output current of a gas filled triode valve, means for passing at least part of said output current in opposite direction through said galvanometer to cause the resultant countertorque to effect together with the negative torque of said galvanometer a balance of said galvanometer, a movement having a pen to draw an ink line on paper which is operated by the output current of the said valve, and means for varying the damping of said movement.

DOUGLAS CRISP GALL.
FRITZ LUDWIG STEGHART.

(References on following page)

REFERENCES CITED

The following references are of record in the file of this patent:

UNITED STATES PATENTS

| Number | Name | Date |
|---|---|---|
| 1,822,075 | Aronoff | Sept. 8, 1931 |
| 1,930,496 | Wilson | Oct. 17, 1933 |
| 2,246,981 | Matheson | June 24, 1941 |
| 2,267,551 | Cherry | Dec. 23, 1941 |

OTHER REFERENCES

Gosman and Heyrovsky: "Analysis of petroleum and its distillates"; Trans. Electro-chemical Society, vol. LIX (1931), pages 249–271; pages 250 and 252 cited.

Matheson and Nichols: "The cathode ray oscillograph applied to the dropping mercury electrode"; Transactions of the Electrochemical Society, vol. LXXIII, 1938; reprint pages 193–210; pages 193–4 cited. A copy of the reprint is in Division 48, Class 175–183–23.1.